US009110943B2

(12) United States Patent
Beach et al.

(10) Patent No.: US 9,110,943 B2
(45) Date of Patent: Aug. 18, 2015

(54) IDENTIFYING AN IMAGE FOR AN ENTITY

(71) Applicant: Google Inc., Mountain View, CA (US)

(72) Inventors: Nathan D. Beach, Sunnyvale, CA (US); Thomas W. Colthurst, Somerville, MA (US); Namrata U. Godbole, Cambridge, MA (US); Russell J. Ryan, Cambridge, MA (US); Matthew K. Gray, Reading, MA (US); Marius G. Andrei, New York, NY (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 13/755,840

(22) Filed: Jan. 31, 2013

(65) Prior Publication Data
US 2015/0161205 A1   Jun. 11, 2015

(51) Int. Cl.
G06F 17/30 (2006.01)
(52) U.S. Cl.
CPC ...... *G06F 17/30424* (2013.01); *G06F 17/3028* (2013.01)
(58) Field of Classification Search
CPC .............. G06F 17/30244; G06F 17/30247; G06F 17/30253; G06F 17/30256; G06F 17/30259; G06F 17/30265; G06F 17/30277; G06F 17/3028
USPC ............ 707/723, 728, 73, 748–752; 382/115, 382/118
See application file for complete search history.

(56) References Cited

U.S. PATENT DOCUMENTS

| 8,285,713 | B2 | 10/2012 | Luo et al. | |
| 2003/0210808 | A1* | 11/2003 | Chen et al. | 382/118 |
| 2007/0003113 | A1* | 1/2007 | Goldberg | 382/118 |
| 2010/0262616 | A1 | 10/2010 | Eskolin et al. | |
| 2010/0287502 | A1 | 11/2010 | Ito et al. | |
| 2011/0264641 | A1* | 10/2011 | Yang et al. | 707/706 |
| 2011/0268323 | A1* | 11/2011 | Gallagher | 382/118 |
| 2011/0299743 | A1* | 12/2011 | Ke et al. | 382/118 |
| 2012/0310967 | A1 | 12/2012 | Szabo et al. | |
| 2013/0054561 | A1* | 2/2013 | Bennett | 707/709 |
| 2013/0182963 | A1* | 7/2013 | Cok | 382/228 |

* cited by examiner

*Primary Examiner* — Hares Jami
(74) *Attorney, Agent, or Firm* — Fish & Richardson P.C.

(57) ABSTRACT

Methods, systems, and apparatus, including computer programs encoded on a computer storage medium, for identifying an image for an entity. In one aspect, a method includes identifying a set of resources. Each resource can include at least one image and reference at least one entity. Each image is assigned to a particular entity based on an overall entity scores for the image relative to the entities. The overall entity score for an image and an entity can specify a measure of topical relatedness between the image and the entity. For each individual entity referenced by at least one of the resources, a group of images that have been assigned to the individual entity is identified. An image evocative of each individual entity is selected from the group based on image rank scores. The image rank score for an image can be determined based on visual characteristics of the image.

31 Claims, 6 Drawing Sheets

IDENTIFYING AN IMAGE FOR AN ENTITY

BACKGROUND

This specification relates to data processing and identifying an image evocative of an entity.

The Internet provides access to a wide variety of resources such as video or audio files, web pages for particular subjects, book articles, or news articles. A search system can identify resources in response to a text search query that includes one or more search phrases (i.e., one or more words) or non-text input such as audio, images, or video that is input as a search query. The search system ranks the resources based on measures of relevance of the resources to the search query and/or measures of quality of the resources. In turn, the search system selects a quantity of the ranked resources and provides search results that link to the selected resources. The search results are typically ordered for viewing according to the rank of the resource to which the search result links, and provided in a search results page.

SUMMARY

In general, one innovative aspect of the subject matter described in this specification can be embodied in methods that include the actions of identifying a set of resources, each resource including at least one image and referencing at least one entity; for each image included in at least one of the resources: identifying, for each of one or more entities, an overall entity score specifying a measure of topical relatedness between the image and the entity; and assigning the image to a particular entity from among the one or more entities, the assignment being performed based on the overall entity score for the image relative to the particular entity; for each individual entity referenced by at least one of the resources: identifying a group of images that have been assigned to the individual entity; determining an image rank score for each image in the group, the image rank score for each image being determined based at least on visual characteristics of the image; and selecting, as a single image evocative of the individual entity, an image from the group based on the image rank scores. Other embodiments of this aspect include corresponding systems, apparatus, and computer programs, configured to perform the actions of the methods, encoded on computer storage devices.

These and other embodiments can each optionally include one or more of the following features. Identifying an overall entity score specifying a measure of topical relatedness between the image and the entity can include determining an entity-image score for the image that references the entity, the entity-image score specifying a topical relatedness between the image and entity; determining an entity-resource score for the entity with respect to a resource that includes the image, the entity-resource score specifying a measure of topical relatedness between the resource and the entity; and determining the overall entity score for the image and the entity based on the entity-image score and the entity-resource score.

Determining an image rank score for each image of the group can include determining the image rank score for a particular image based on both the visual characteristics of the image and the entity-image score for the particular image and the individual entity.

Determining an image rank score for each image in the group can include identifying a number of resources that include a particular image in the group; and determining the image rank score for the particular image based on the number of resources that include the particular image.

Determining an image rank score for each image of the group can include determining that the individual entity is a person. For each image of the group, it can be determined whether the image includes a depiction of a face. For each image in the group, an image rank score can be determined based on whether the image includes a depiction of a face.

Aspects can further include validating the selected image by performing a search using the selected image to identify resources relevant to the selected image; determining, based on results provided by the search, that the selected image is not included on a resource that is included in a list of unqualified resources; and in response to determining that the selected image is not included on a resource included in the list of unqualified resources, validating the selected image as eligible to be provided in response to requests for an image of the entity.

Determining an image rank score for each image of the group can include identifying one or more entity queries for the individual entity; causing a limited image search to be performed for each of the one or more entity queries, each limited image search being limited to the group of images for the individual entity, each limited search identifying a ranking for the images of the group; identifying a proper subset of the images of the group based on the rankings; and determining the image rank score for each image of the proper subset of images.

Another innovative aspect of the subject matter described in this specification can be embodied in methods that include the actions of identifying, for an entity, one or more entity queries for the entity, the entity queries for the entity being search queries that have been deemed requests for information about the entity; identifying a set of images related to the entity, each image of the set of images being relevant to at least one of the entity queries; identifying resources that each include at least one image from the set of images; determining, for each of the identified resources, an entity-resource score for the resource, the entity-resource score for each resource being a measure of topicality of the resource's content with respect to the entity; selecting a proper subset of images from the set of images based on the entity-resource scores for the resources that include the images; determining an image rank score for each image of the proper subset, the image rank score for each image of the proper subset being based at least on visual characteristics of the image; and selecting an image that is evocative of the entity based on the image rank scores for the images of the subset of images. Other embodiments of this aspect include corresponding systems, apparatus, and computer programs, configured to perform the actions of the methods, encoded on computer storage devices.

These and other embodiments can each optionally include one or more of the following features. Selecting a proper subset of images from the set of images can include: for each image of the set of images: identifying the entity-resource score for each resource with which the image is included; determining whether at least a threshold number of resources with which the image is included has an entity-resource score that satisfies a threshold score; and assigning the image to the proper subset in response to determining that at least a threshold number of resources with which the image is included has an entity-resource score that satisfies the threshold score.

Identifying a set of images related to the entity can include, for each entity query of the one or more entity queries for the entity: performing an image search operation using the entity query as an input, the image search operation identifying one or more images relevant to the entity query; and selecting up to a threshold number of the one or more images for inclusion in the set of images.

The image rank score for each image of the proper subset can be based on a number of resources with which the image is included. The entity can be a person. The image rank score for each image can be based on whether the image includes a depiction of a face.

The entity can be a country or a state. The image rank score for each image can be based on whether the image includes a depiction of a flag.

The entity can be an organization. The image rank score for each image can be based on whether the image includes a depiction of a logo.

Particular embodiments of the subject matter described in this specification can be implemented so as to realize one or more of the following advantages. An image that is evocative of an entity can be identified and provided in response to search queries related to the entity. Images for an entity can be more accurately ranked using topicality scores that indicate the topical relatedness between the image (or resources that include the image) and an entity related to the image.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can identify an image evocative of an entity, such as a person, country, or sports team. After identifying the image, the image can be used for various purposes. For example, the image may be included in a knowledge panel for the entity, in a search result for the entity, or in a resource having content related to the entity. Throughout this document an image that is identified as evocative of a particular entity is also referred to as an image for the particular entity.

The system can identify an image evocative of an entity in multiple ways. In some implementations, the system identifies one or more entity queries that have been determined to reference that entity and initiates an image search operation using each entity query to identify a set of images. For example, the set of images may include the top "n" images for each entity query, such as the top ten images for each entity query. For each image, the system can identify a set of resources (e.g., web pages) that each includes the image and determine an entity-resource score for each resource with respect to the entity. The entity-resource score for a resource, with respect to a particular entity, specifies a measure of topical relatedness between the resource and the particular entity.

The system can filter the images based on the entity-resource scores for the images' respective resources. For example, images that are presented on resources that have low entity-resource scores (e.g., less than a threshold score) may be filtered from the set of images. The system can rank the remaining images using the entity-resource scores and/or features of the images, such as content presented by the images, image size, resolution, and aspect ratio.

In some implementations, the system identifies a set of resources that each includes at least one image. For each image, an entity-image score is determined for each of one or more entities that may be represented by, referenced by, or otherwise related to the image. The entity-image score for an image, with respect to a particular entity, specifies a measure of topical relatedness between the image and the particular entity. For example, an image that depicts a single identifiable person may have a high entity-image score for that person. The system can assign each image to the entity for which the image has the highest entity-image score. At this point, each image is assigned to an entity and the system can group the images based on their respective entity. Thus, each entity can have a group of one or more images deemed to be images for the entity. For each entity, the images for the entity are ranked relative to one another and an image is selected for the entity based on the rankings. These rankings can be based on image rank scores that can be determined based on features of the images, such as content presented by the images, image size, resolution, and aspect ratio.

Figure 1:
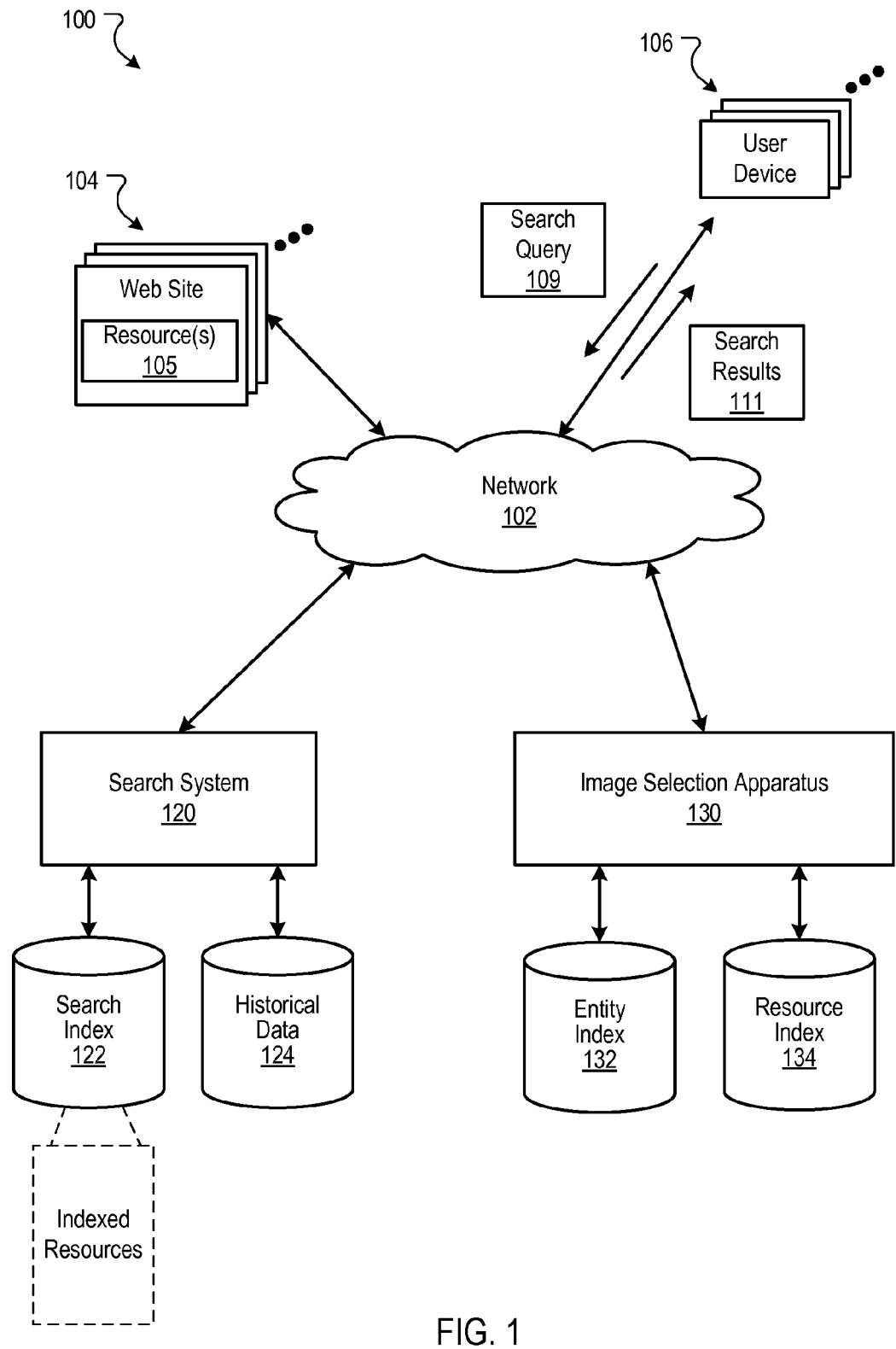
FIG. 1 is a block diagram of an example environment in which a search system provides search services.

In some implementations, the system can use a hybrid approach that includes features of the approaches described above. For example, the system may identify a set of candidate images for an entity using entity-image scores as described above. The system can then initiate an image search for images related to the entity using one or more entity queries for the entity. The results of these searches may be limited to results that include one of the images in the set of candidate images. The top "n" images for each entity query are included in a set of images. The search system can filter the set of images based on entity-resource scores for resources that contain the images as described above. The system can also rank the remaining images, for example, based on the entity scores and/or features of the images. FIG. 1 is a block diagram of an example environment 100 in which a search system 120 provides search services. The example environment 100 includes a network 102, e.g., a local area network (LAN), wide area network (WAN), the Internet, or a combination of them, connects web sites 104, user devices 106, and the search system 120. The network 102 can be accessed over a wired and/or a wireless communications link. For example, mobile computing devices, such as smartphones can utilize a cellular network to access the network. The environment 100 may include many web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address, e.g., a uniform resource locator. Resources 105 that can be provided by a web site 104 include HTML pages, word processing documents, and portable document format (PDF) documents, audio, images, video, and feed sources, to name just a few. The resources 105 can include content, e.g., words, phrases, images, and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile computing devices, e.g., smartphones and/or tablet computing devices, that can send and receive data over the network 102. As used throughout this document the term mobile computing device ("mobile device") refers to a user device that is configured to communicate over a mobile communications network. A smartphone, (i.e., a phone that is enabled to communicate over the Internet) is an example of a mobile device. A user device 106 typically includes a user application, e.g., a web browser, to facilitate the sending and receiving of data over the network 102.

To facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In response, the search system 120 accesses the search index 122 to identify resources 105 that are relevant to, e.g., have at least a minimum specified relevance score for, the search query 109. The search system 120 identifies the resources 105, generates search results 111 that identify the resources 105, and returns the search results 111 to the user devices 106. A search result 111 is data generated by the search system 120 that identifies a resource 105 that is responsive to a particular search query, and includes a link to the resource 105. An example search result 111 can include a web page title, a snippet of text or a portion of an image extracted from the web page, and the URL of the web page.

Data for the search queries 109 submitted during user sessions are stored in a data store, such as the historical data store 124. For example, the search system 110 can store received search queries in the historical data store 124. Selection data specifying actions taken in response to search results 111 provided in response to each search query 109 are also stored in the historical data store 124, for example, by the search system 120. These actions can include whether a search result 111 was selected (e.g., clicked or hovered over with a pointer). The selection data can also include, for each selection of a search result 111, data identifying the search query 109 for which the search result 111 was provided.

The example environment 100 also includes an image selection apparatus 130 that can identify an image for an entity. The image selection apparatus 130 is a data processing apparatus that includes (or is communicably coupled to) an entity index 132 and a resource index 134. The entity index 132 is an index of entities, such as people, places, countries, landmarks, animals, historical events, organizations, businesses, sports teams, sporting events, movies, songs, albums, games, works of art, or other types of entities. The image selection apparatus 130 can identify an image for each entity and store the image, or data identifying the image, in the entity index 132 with a reference to the entity. Example processes for identifying an image for an entity are described below.

The entity index 132 can also include, for each entity, one or more entity queries. Entity queries for a particular entity are search queries that have been deemed requests for information about the particular entity. For example, a query for "Generic Name" may be deemed to be an entity query for the celebrity named "Generic Name" rather than an entity query for a less well known scientist having the same name.

The designation of a particular phrase as an entity query can be based, at least in part, on historical user interaction with search results that have been provided in response to the particular phrase being received as a search result. For example, assume that 99% (or some other majority portion) of the users that submit the search query "Generic Name" interact with search results for resources that reference the celebrity rather than search results that reference the scientist. In this example, it can be determined that the search query "Generic Name" is a request for information about the celebrity, such that "Generic Name" can be selected as an entity query for the celebrity.

The entity queries for a particular entity can include any phrase that is deemed to be an unambiguous request for information about the particular entity (e.g., based on statistical probabilities). For example, the entity queries for a famous person may include the famous person's birth name and any known aliases for the famous person. For example, entity queries for a famous singer may include a stage name that the famous singer is known by.

As many people can share the same name, it is possible that other people share a name with a famous person, or another person for whom a particular name is deemed an entity query. The entity queries for a person having a name that has been deemed an entity query for another entity may include additional terms that distinguish the person from other people who may have the same name. For example, assume that a lesser known scientist has the same name as a very famous baseball player, and that a search query for the name has been deemed an entity query for the baseball player. In this example, the set of entity queries for the scientist may not include a phrase including only the scientist's name. Instead, the entity queries for the scientist may include a phrase that includes the scientist's name and one or more additional distinguishing terms, such as "scientist."

The image selection apparatus 130 can use the entity search queries to identify candidate images for the entities. For example, as described in more detail below, the image selection apparatus 130 can use the entity queries for a particular entity to identify images that are responsive to the entity queries or included in resources that include images and are responsive to the entity queries. The identified images can be considered candidate images for the particular entity and evaluated to select an image that is evocative of the particular entity.

The resource index 134 is an indexed set of resources that the image selection apparatus 130 can use to identify images for entities, as described in detail below. For example, the resource index 134 can include an index of web pages that each include at least one image and optionally copies of the web pages that each includes at least one image.

Figure 6:
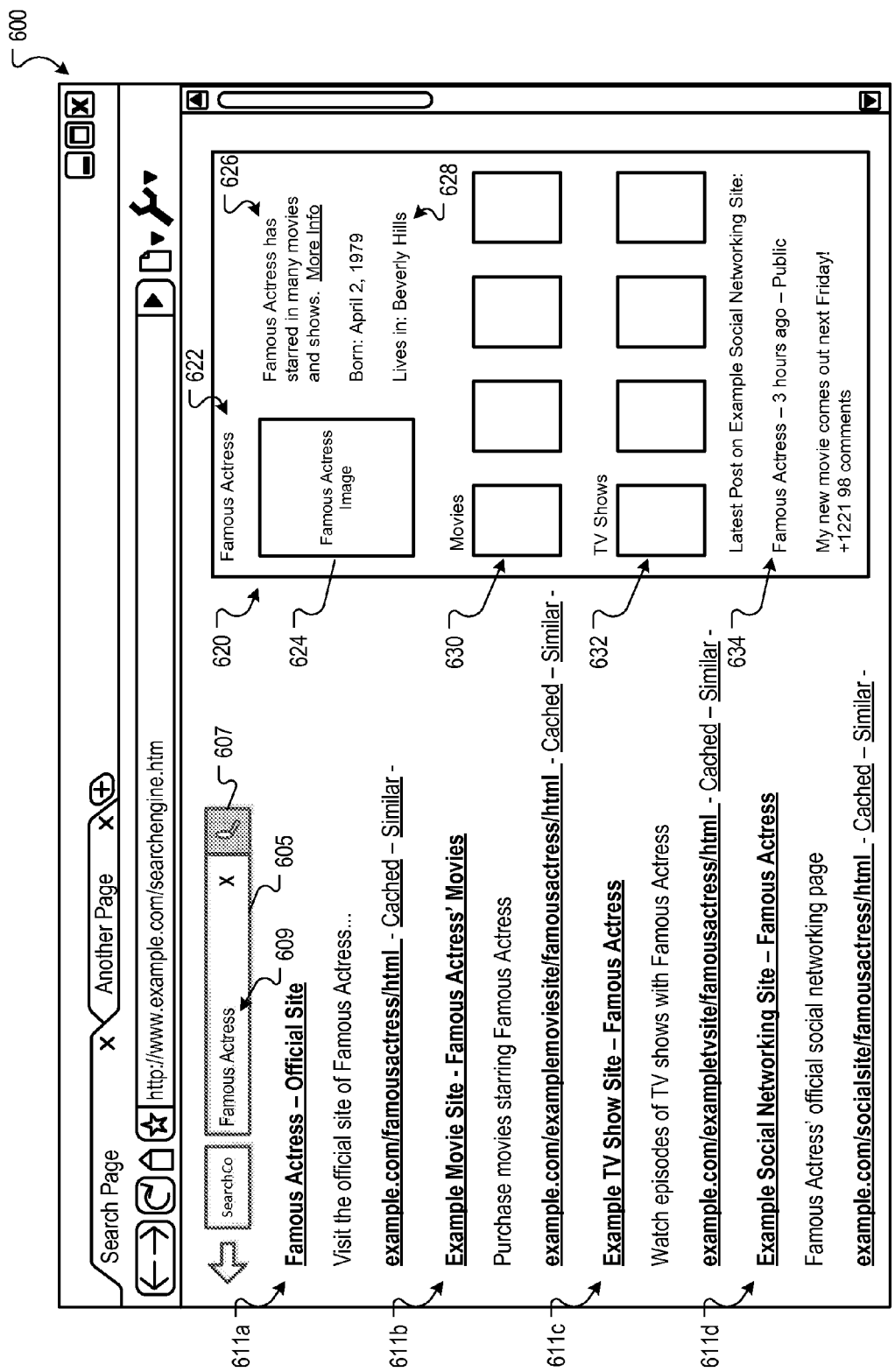
FIG. 6 is a screen shot of a search interface in which a knowledge panel that includes an image for an entity is presented with search results.

The image selection apparatus 130 can provide an image for an entity in response to a request. For example, the search system 120 may submit a request to the image selection apparatus 130 to obtain an image for a particular entity in response to receiving a search query 109 related to the particular entity (e.g., a search query that matches an entity query for the particular entity). The search system 120 can provide the image to a user device 106 that submitted the search query 109, for example as part of a knowledge panel for the particular entity. In general, a knowledge panel for a particular entity includes content that is related to the particular entity and can be provided alongside search results provided in response to the search query 109. An example knowledge panel is illustrated in FIG. 6 and described below. Although the image selection apparatus 130 is illustrated in FIG. 1 as being a separate apparatus from the search system 120, the image selection apparatus 130 may be a part of the search system 120 in some implementations.

Figure 2:
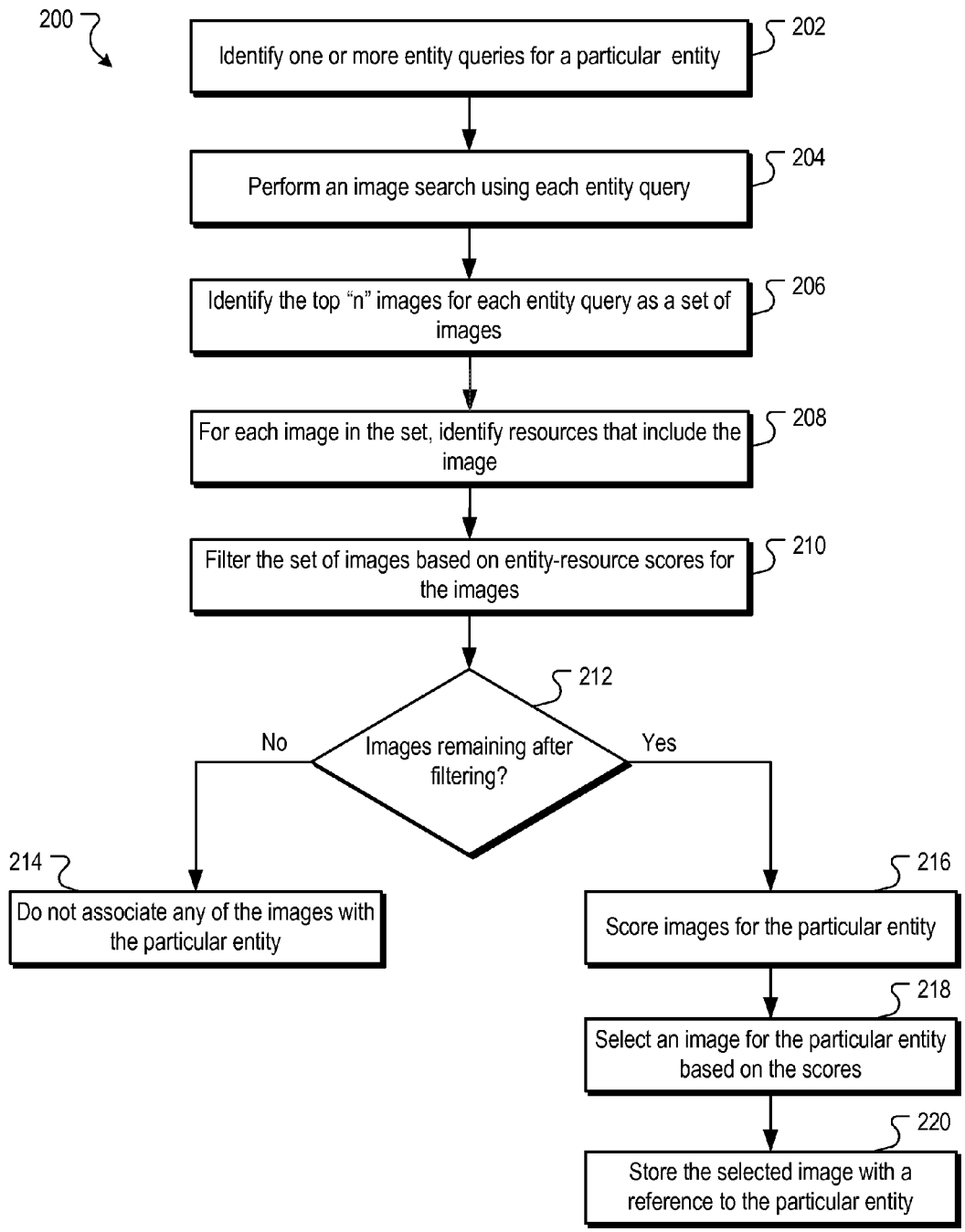
FIG. 2 is a flow chart of an example process for identifying an image for a particular entity.

FIG. 2 is a flow chart of an example process 200 for identifying an image for a particular entity. The example process can, for example, be implemented by the image selection apparatus 130 of FIG. 1 or another data processing apparatus. In some implementations, the operations of the example process 200 can be implemented as instructions stored on a non-transitory computer readable medium, where the instructions cause a data processing apparatus to perform operations of the example process 200.

One or more entity queries are identified for the particular entity (202). For example, the image selection apparatus 130 may access the entity index 132 to identify the one or more entity queries that have been identified for the entity. As described above, the entity index 132 can include data specifying one or more entity queries for each entity indexed in the entity index 132. These entity queries can include the name of the particular entity, any known aliases for the particular entity, and search queries having the name or alias appended with one or more additional terms related to the particular entity.

An image search is performed for each of (or a proper subset of) the entity's one or more entity queries (204). In some implementations, the image selection apparatus 130 provides the entity queries to the search system 120 with a request to perform an image search for each of the entity queries. In response, the search system 120 performs the searches to identify a set of images responsive to each entity query and provides data specifying the sets of images to the image selection apparatus 130.

The data received by the image selection apparatus 130 also specifies a rank or order for images in each set of images for its respective entity query. For example, assume that in response to each entity query, the search system 120 returns the top fifty images for the entity query. In this example, the data received by the image selection apparatus 130 can identify, for each entity query, the top fifty images and their relative rank among the other images for that entity query.

In some implementations, the search system 120 ranks the images for a particular entity query based on a relevancy score for each image. The relevance score for an image with respect to a particular entity query is a measure of the relevancy of the image to the particular entity query. For example, an image having a higher relevancy score for a particular entity query may be considered more relevant to the particular entity query than another image having a lower relevancy score for the particular entity query.

The data received by the image selection apparatus 130 can also include, for each identified image, data specifying resources (e.g., web pages) that are responsive to the entity query and/or that include image. For example, the search index 120 may include data specifying, for each indexed resource 105, images presented by the resource 105. The search system 120 can use this data to identify resources 105 that includes a particular image.

A set of images that include the top "n" images for each entity query is identified (206). The parameter "n" may be any number, for example as specified by a system designer or administrator. For example, the image selection apparatus 130 may be configured to select, for inclusion in the set of images, the top ten images (or another number of images) for each individual search query.

For each image in the set of images, one or more resources that include the image are identified (208). For example, the image selection apparatus 130 may identify the resources using the data provided by the search system 120. Each identified image has a set of one or more resources that include the image.

The set of images is filtered based on entity-resource scores for the images (210). For each image in the set of images, the image selection apparatus 130 can determine an entity-resource score for each resource that includes the image. As described above, the entity-resource score for a resource, with respect to a particular entity, specifies a measure of topical relatedness between the resource and the particular entity. For example, if the entity is a famous football player, a web page that includes content, such as a full article, about the football player may have a higher entity-resource score for the football player than a web page that includes content about the player's team, but only includes a single reference to the player (e.g., in a roster listing all players).

Figure 3:
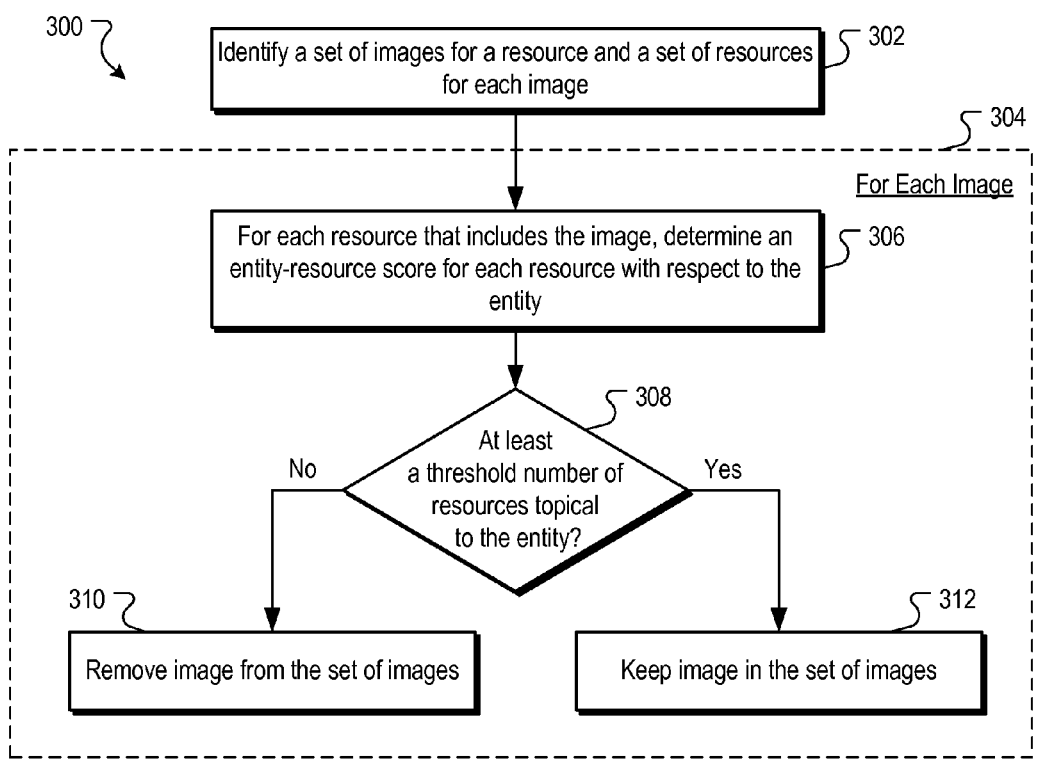
FIG. 3 is a flow chart of an example process for filtering a set of images for an entity.

The image selection apparatus 130 can determine, using the entity-resource scores, which images are included on one or more topical resources (e.g., resources that have at least a threshold entity-resource score for the entity) and keep those images from the topical resource in the set. Images that are included on non-topical resources (e.g., resources that have less than a threshold entity-resource score for the entity) can be filtered from the set of images. An example process for filtering images based on the entity-resource scores is illustrated in FIG. 3 and described below.

A determination is made whether the set of images includes at least one image after the filtering process (212). If the image selection apparatus 130 determines that no images remain in the set, the image selection apparatus 130 may not associate any images with the entity (214), and the process 200 can be performed for another entity.

If the image selection apparatus 130 determines that the set includes one or more images, then image rank scores are determined for the one or more images (216). In some implementations, the image selection apparatus 130 determines an image rank score for each image based on the entity-resource scores for the image's resources, based on features of the image, and/or based on a number of resources that include the image. For example, an image that is presented on many resources that reference the entity may have a higher image rank score than an image that is presented on only one resource.

For image rank scores that are based on the entity-resource scores, the image selection apparatus 130 may determine an overall entity-resource score for each image by combining the entity-resource scores for each individual resource that includes the image. The overall entity-resource score may be proportional to the average of the individual entity-resource scores, or another measure of central tendency for example. The image rank score for an image may be based on the overall entity-resource score for the image's resources. The features of an image used for determining an image rank score for an image can include content depicted by the image, visual characteristics of the image, size of the image (e.g., number of pixels), image resolution, and/or aspect ratio, to name a few examples. The effect of image size and aspect ratio on an image rank score may depend on the resource on which the image will be presented if identified as the image for the entity. For example, there may be a preferred size or range of sizes for images presented in a knowledge panel.

Images that are sized within the range may receive a higher image rank score than an image that is smaller or larger than the preferred range.

The image features used to determine the image rank score may differ based on the type of entity. For example, there may be a preference for the content of the image based on the type of entity. For a person, it may be preferred to identify an image of the person's face. For example, an image of the person's face may be more identifiable to a user than an image of the person in a group of people and/or from a distance. Thus, for a person, images of a face may receive a higher image rank score than images that depict additional content.

The gender of the person may also be used to determine the image rank score for an image. For example, the image selection apparatus 130 may evaluate the image to predict the gender of a person depicted in the image. The image selection apparatus 130 may then compare the predicted gender to the person's actual gender to determine if there is a match. If the genders match, then the image rank score for the image may be higher than if there is not a match.

For countries and states, an image of the flag of the country or state may be preferred. Thus, images that depict the flag for the country or state may receive a higher image rank score for the country or state than images that do not depict the flag. Similarly, an image of a logo may be preferred for companies, sports teams, or other organizations that have a logo. Thus, images that depict the logo for the organization may receive a higher image rank score for the organization than images that do not depict the logo.

An image is selected for the entity based on the image rank scores for the images (218). For example, the image selection apparatus 130 may select the image having the highest image rank score. In some implementations, the image selection apparatus 130 may select more than one image based on the image rank scores.

The selected image is stored (220). For example, the image selection apparatus 130 may store the image in the entity index 132 with a reference to the entity. The image selection apparatus 130 can then provide the image in response to requests for an image of the entity.

FIG. 3 is a flow chart of an example process 300 for filtering a set of images for a particular entity. The example process 300 can, for example, be implemented by the image selection apparatus 130 of FIG. 1 or another data processing apparatus. In some implementations, the operations of the example process 300 can be implemented as instructions stored on a non-transitory computer readable medium, where the instructions cause a data processing apparatus to perform operations of the example process 300.

Data specifying a set of images for an entity and a set of resources for each image are identified (302). For example, the image selection apparatus 130 may identify the set of images and the set of resources using operations similar to those described above with reference to the operations 202-206 of FIG. 2.

For each image, a determination is made whether to filter the image from the set of images or to keep the image in the set (304). In some implementations, this determination is made based on entity-resource scores for resources that include the image. For example, the determination of whether to filter an image from the set can be made using constituent operations (306)-(312).

For each resource that includes a particular image in the set of images, an entity-resource score is determined for the resource with respect to the particular entity (306). The entity-resource score for a resource can be based, for example, on a number of references to the particular entity (or to an alias of the entity) that are included in the resource, a location in the resource (e.g., title, body, margin) of the reference to the particular entity, or presentation characteristics of the reference to the particular entity (e.g., bolded font). The entity-resource score for a resource can also be based on meta information for the resource, a URL for the resource, a domain for the resource, and/or other data regarding the resource. For example, if the URL for the resource includes a reference to the particular entity, then the entity-resource score for the resource may be higher than a resource that only includes a reference to the particular entity in the body of the resource.

A determination is made whether a resource(s) that includes the particular image is topical to the particular entity (308). In some implementations, the image selection apparatus 130 compares the entity-resource score for each resource that includes the particular image to a threshold score. Resources having entity-resource scores that meet the threshold score can be deemed topical to the particular entity, while resources having entity scores that do not meet the threshold entity score can be deemed non-topical to the particular entity. In some implementations, if at least a threshold number of the resources (e.g., at least one) has a topicality score that meets the threshold score, the image selection apparatus 130 may determine that the image is topical to the particular entity, and can remain in the set of images (312).

If a determination is made that less than the threshold number of resources has at least the threshold entity-resource score, the particular image may be filtered or otherwise removed from the set of images (310). Thus, if none of the resources that include the image is considered topical to the entity, that image is removed from consideration of being the image for the entity.

In some implementations, the image selection apparatus 130 can determine whether to keep an image in the set of images based on a combination of entity-resource scores for resources that include the image. For example, the image selection apparatus 130 may determine an average of the entity-resource scores and compare the entity-resource scores to a threshold score. If the average score meets the threshold score, then the image selection apparatus 130 may keep the image in the set (310) rather than filtering the image from the set (312).

The image selection apparatus 130 can repeat the operations (306)-(312) for each image in the set of images to generate a filtered set of images. This filtered set of images can include zero or more images based on the entity-resource scores of the resources that include the images and the value of the threshold score. The filtered set of images can be used to identify an image that is evocative of the entity.

Figure 4:
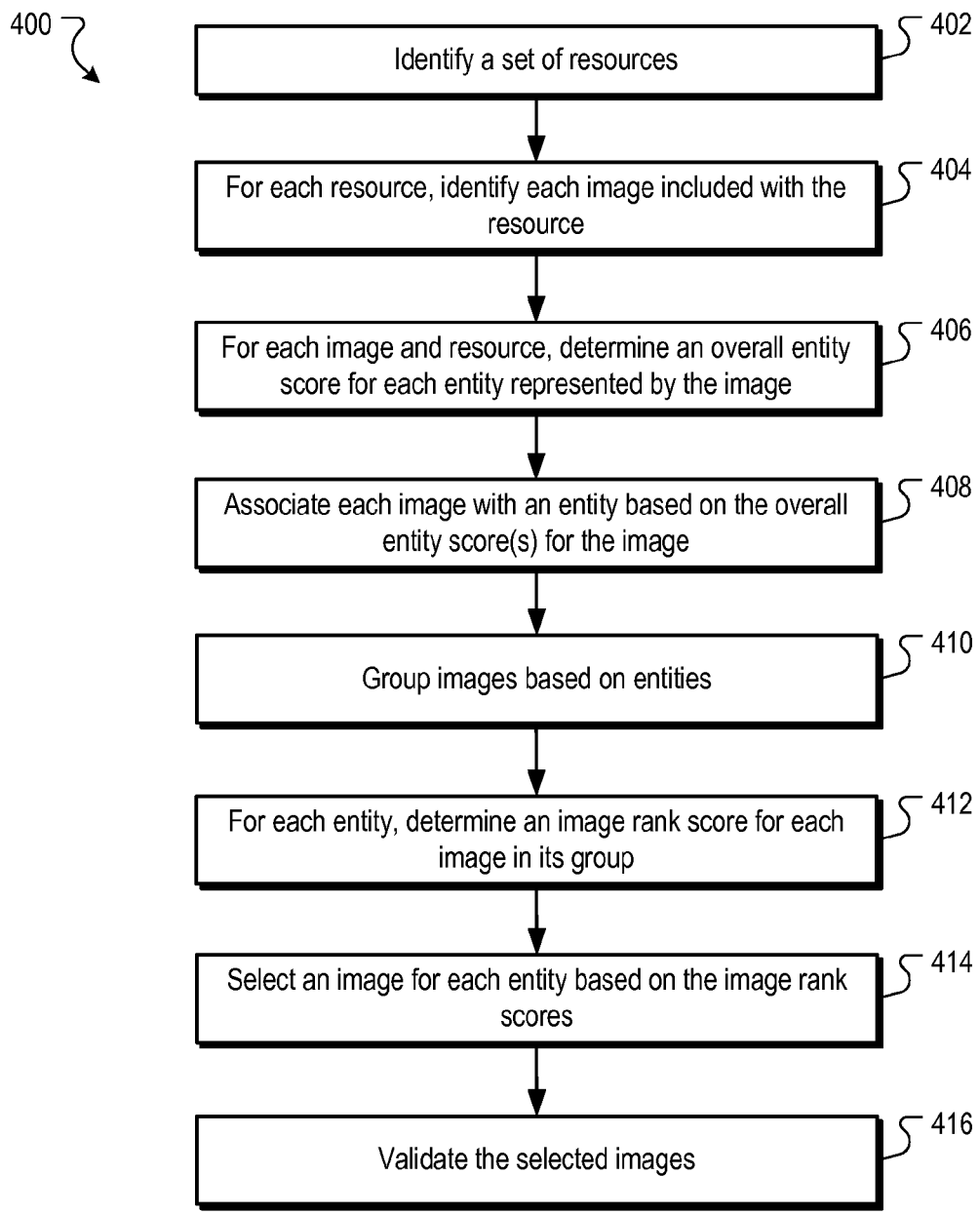
FIG. 4 is a flow chart of another example process for identifying an image for an entity.

FIG. 4 is a flow chart of another example process 400 for identifying an image for an entity. The example process 400 can, for example, be implemented by the image selection apparatus 130 of FIG. 1 or another data processing apparatus. In some implementations, the operations of the example process 400 can be implemented as instructions stored on a non-transitory computer readable medium, where the instructions cause a data processing apparatus to perform operations of the example process 400.

A set of resources is identified (402). The image selection apparatus 130 may select a subset of the resources indexed in the search index 122 for the set of resources. For example, the image selection apparatus 130 may select, for the set, resources that include at least one image. The set of resources may be indexed and/or stored in the resource index 134.

One or more images are identified for each resource (404). The one or more images that are identified for a resource are the images included on the resource. For example, a web page may present one or more images when displayed on a user device 106. The image selection apparatus 130 can identify the one or more images for each resource using indexed information, for example obtained by the search system 120 by crawling the resources.

For each image, an overall entity score is determined for one or more entities with respect to the image (406). The overall entity score for an image and a particular entity pair specifies a measure of topicality or relevance of the image to the particular entity. For example if the only entity in a first image is a particular person, the overall entity score for that particular person with respect to the first image is likely to be higher than the overall entity score for the particular person with respect to a second image that includes the particular person and another person, as the image may be deemed to also be topical to the other person.

In some implementations, the image selection apparatus 130 generates tuples that each includes an image and a resource that includes the image. For each tuple, the image selection apparatus 130 can identify one or more entities that may be represented, or referenced, by the image of the tuple, and determine an overall entity score for each of the one or more entities with respect to the image. The overall entity score for the image and the particular entity can be based on an entity-image score for the image and the particular entity and/or one or more entity-resource scores for resource(s) that include the image.

For each tuple, the image selection apparatus 130 can identify one or more entities referenced by the resource of the tuple. For each identified entity, the image selection apparatus 130 can determine an entity-resource score for the entity with respect to the resource. This entity-resource score for a particular entity may be based on a number of references to the particular entity (or to an alias of the entity) that are included in the resource, a location in the resource (e.g., title, body, margin) of the reference to the particular entity, or presentation characteristics of the reference to the particular entity (e.g., bolded font), meta information for the resource, a URL for the resource, a domain for the resource, and/or other data regarding the resource, as described above.

For each entity identified in the resource, the image selection apparatus 130 can also determine an entity-image score for the entity with respect to the image itself. As described above, the entity-image score for an image, with respect to a particular entity, specifies a measure of topical relatedness between the image and the particular entity. The entity-image score for a particular entity may be based on meta information for the image (e.g., a label identifying the subject of the image, a title for the image, and/or a file name for the image), a URL for the image, and/or content presented proximal to the image in the resource. For example, an image that includes, in its meta information, data identifying the particular entity may receive a high entity-image score for the particular entity than an image that does not include such data. For an image that depicts multiple entities, if the meta information only identifies one of the depicted entities, the entity-image score for the one entity may be higher than the entity-image score for the other depicted entities.

For each tuple, the image selection apparatus 130 can determine an overall entity score for each entity represented in the image of the tuple. The overall entity score for a particular entity may be determined using the entity-resource score for the resource of the tuple with respect to the particular entity, and the entity-image score for the image relative to the particular entity. For example, the image selection apparatus 130 may determine the overall entity score for an image relative to a particular entity by computing an average or weighted average of the entity-resource score and the entity-image score for the image. In a weighted average computation, the entity-image score may be weighted more than the entity-resource score, for example.

If the image is included in multiple resources, the image selection apparatus 130 may determine, per-resource a per-resource overall entity score for each entity represented in the image. In some implementations, the per-resource overall entity scores for a particular entity are combined to obtain the overall entity score for the image relative to that particular entity.

Each image is assigned to an entity based on the overall entity scores for the entities represented in, or referenced by, the image (408). For example, the image selection apparatus 130 may identify two or more entities for an image. In this example, the image selection apparatus 130 may determine a first overall entity score for the image that specifies a measure of topicality, or relatedness, of the image to a first of the entities, and a second overall entity score for the image that specifies a measure of topicality, or relatedness, of the image to a second of the entities. In such cases, the image selection apparatus 130 can select, based on the overall entity scores, one of the identified entities as being the most topical to the image and assign the image to the most topical entity. For example, the image selection apparatus 130 may assign the image to the one entity for which the image has the highest overall entity score.

To illustrate, consider an image that depicts a famous soccer player and his wife. If the image is published on web pages that include content about the soccer player and not published on web pages that include content that is primarily about his wife, the soccer player may receive a higher overall entity score for the image than his wife. To select an entity for the image, the image selection apparatus 130 would consider the image to be more topical to the soccer player based on the overall entity score and assign the image to the soccer player, rather than his wife. For images for which only one entity is identified, the image may be assigned to the one entity. The associations between the images and the entities can be stored in the entity index 132.

The images are grouped by their assigned entities (410). For each entity that has at least one assigned image, the image selection apparatus 130 can generate a group of one or more images that are assigned to the entity.

For each entity that has a group of assigned images, an image rank score is determined for each image of the entity's group (412). The image rank score for an image can be based on the overall entity score(s) for the entity with respect to the image, based on features of the image, and/or based on a number of resources that include the image. As described above, the features of an image that can be used to determine an image rank score can include content depicted by the image (e.g., face, flag, logo, etc.), size of the image, resolution, aspect ratio, and other features.

An image is selected for each entity (414). The image selection apparatus 130 may select an image for an entity from its group of images based on the image rank scores for the images. For example, the image selection apparatus 130 may select the image having the highest image rank score as the image for the entity and store the image in the entity index 132 with a reference to the entity.

The images selected for the entities are validated (416). In some implementations, the image selection apparatus 130 initiates a search using the image and evaluates search results for the image to determine whether to provide the image in response to requests related to the entity. For example, the image selection apparatus 130 may evaluate entity-resource scores of the resources referenced by the search results to determine whether the resources are topical to the entity. If the resources are deemed to be topical, then the image selection apparatus 130 may consider the image validated and provide the image in response to requests.

In some implementations, the image selection apparatus evaluates the search results to determine whether the search results are "blacklisted" or "unqualified." For example, the image selection apparatus 130 may compare the resources referenced by the search results to one or more blacklists to determine whether one or more of the resources are included on a blacklist. An example blacklist may include resources deemed to be offensive to users. If at least a threshold number of resources are on the blacklist, then the image may not be validated, and another image may be selected for the entity instead.

Figure 5:
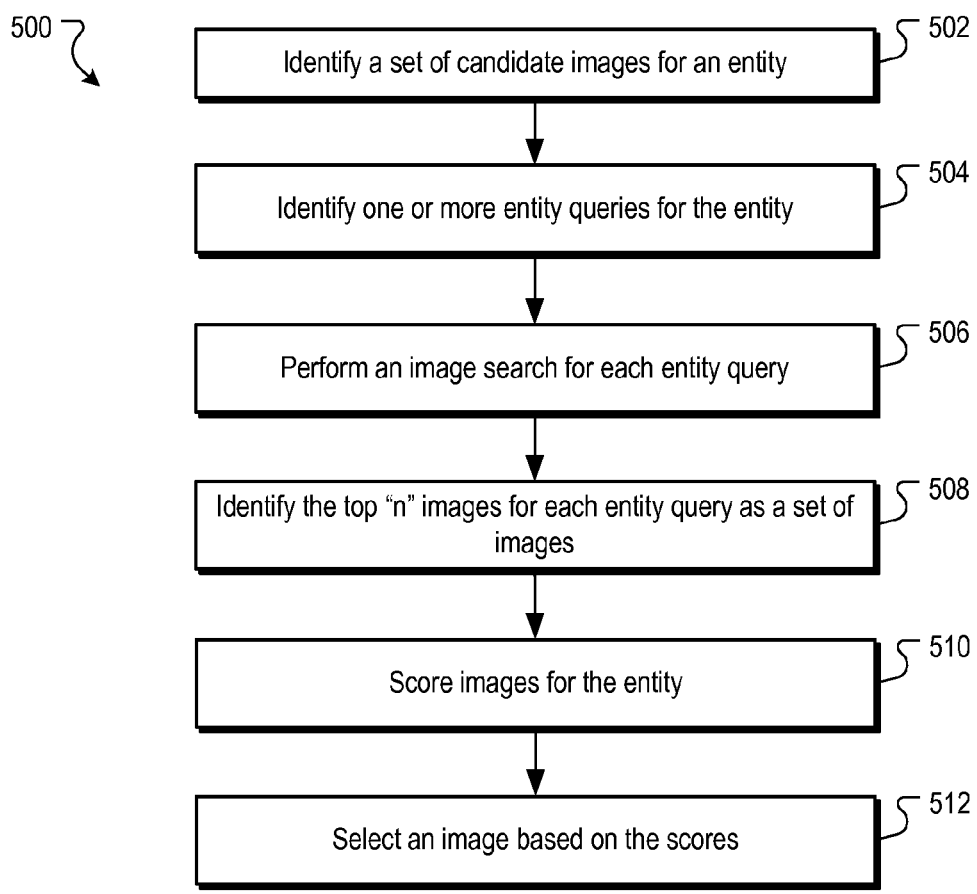
FIG. 5 is a flow chart of another example process for identifying an image for an entity.

FIG. 5 is a flow chart of another example process 500 for identifying an image for an entity. This example process 500 employs concepts of the example processes 200 and 400 described above. The example process 500 can, for example, be implemented by the image selection apparatus 130 of FIG. 1 or another data processing apparatus. In some implementations, the operations of the example process 500 can be implemented as instructions stored on a non-transitory computer readable medium, where the instructions cause a data processing apparatus to perform operations of the example process 500.

A set of candidate images are identified for an entity (502). The image selection apparatus 130 can identify a set of candidate images that are considered to depict the entity and/or that are topical to the entity. In some implementations, the image selection apparatus 130 identifies the set of candidate images for the entity by identifying a set of resources that each includes at least one image, identifying the images of the resources, and from those images, identifying images that are topical to the entity. This operation of identifying the set of candidate images can be similar to operations (402)-(410) of the process 400 illustrated in FIG. 4 and described above. Thus, the entity may include a set of candidate images that have been associated with the entity based on topicality scores for the entity with respect to the images.

One or more entity queries are identified for the entity (504). For example, the image selection apparatus 130 may access the entity index 132 to identify the one or more entity queries for the entity. As described above, the entity index 132 can include data specifying one or more entity queries for entities indexed in the entity index 132. These entity queries can include the name of the entity, any known aliases for the entity, and entity queries having the name or alias appended with one or more additional terms related to the entity.

An image search is performed for each entity query (506). In some implementations, this image search is limited to the set of candidate images identified for the entity. For example, the image selection apparatus 130 may provide the entity queries to the search system 120 with a request to perform a limited image search using the entity queries and only returning a ranking of the candidate images. In response, the search system 120 can perform the limited search using each entity query and return to the image selection apparatus 130 a ranking of the candidate images for each entity query.

A set of images that include the top "n" images for each entity query is identified (508). The parameter "n" may be any number, for example as specified by a system designer or administrator. For example, the image selection apparatus 130 may be configured to select, for inclusion in the set of images, the top ten images for each individual search query.

The images of the set of images are scored for the entity (510). The image selection apparatus 130 can score the images in numerous ways. In some implementations, the images scored in a similar process to that of FIG. 2. In such a process, the image selection apparatus 130 identifies, for each image, resources that include the image and determines an entity-resource score for each of the resources with respect to the entity. The image selection apparatus 130 can filter the set of images using the entity-resource scores and determine an image rank score for the remaining images, as described above with reference to operations (210)-(216) of FIG. 2. For example, the image rank score for each image can be based on the entity-resource scores for the image's resources, based on features of the image, and/or based on a number of resources that include the image.

In some implementations, the image selection apparatus 130 determines an image rank score for each image based on an entity-image score for the image with respect to the entity, entity-resource scores for resources that include the image, features of the image, and a number of resources that include the image. This scoring process is similar to the scoring process of operation (410) of FIG. 4 described above.

In some implementations, the image selection apparatus 130 can score the images using both processes and combine the resulting scores for each image. For example, the image selection apparatus 130 may determine a first image rank score by filtering the images using entity-resource scores and then scoring the images based on the entity-resource scores for the image's resources, based on features of the image, and/or based on a number of resources that include the image. The image selection apparatus 130 can also determine a second image rank score for each image using an entity-image score for the image with respect to the entity, entity-resource scores for resources that include the image, features of the image, and a number of resources that include the image. The image selection apparatus 130 can combine the first image rank score and the second image rank score for an image to determine an overall image rank score for the image. For example, the overall image rank score for an image may be the average or a weighted average of the first and second image rank scores.

An image is selected for the entity based on the image rank scores for the images (512). For example, the image selection apparatus 130 may select the image having the highest image rank score and store the selected image in the entity index with a reference to the entity.

FIG. 6 is a screen shot of an example search interface 600 in which a knowledge panel that includes an image for an entity is presented with search results. The search interface 600 can be presented at a user device 106 and includes a query entry field 605 in which a user can enter a search query 609. The search interface 300 also includes a query initiation element 607 with which the search query 609 can be submitted to the search system 120. For example, in response to user interaction with the search initiation element 607, the user device 106 can submit the search query 609 to the search system 120.

The search interface 600 also includes a knowledge panel 620 and search results 611a-611d. In this example search interface 300, the knowledge panel 620 and the search results 611a-611d have been provided in response to the search query "Famous Actress." The knowledge panel 620 includes a title 622, a description 626, and a set of facts about Famous Actress.

The knowledge panel 620 also includes an image 624 that is evocative of the entity Famous Actress. For example, the image may be a photograph of Famous Actress' face, or another image of Famous Actress. The image 624 may be identified for Famous Actress using the example processes described above. For example, upon receipt of a search query that is determined to reference Famous Actress, the search system 120 may send a request to the image selection apparatus 130 to identify an image of Famous Actress for inclusion in a knowledge panel. The image selection apparatus 120 can identify (or may have previously identified using an offline process) an image evocative of Famous Actress as described above and provide data identifying the image or the image itself to the search system 120. The search system 120 may include the image in a knowledge panel, such as knowledge panel 620 that is provided with search results 611*a*-611*d* for Famous Actress.

The example knowledge panel 620 also includes a set of images 630 of movie posters for movies in which Famous Actress appeared and a set of images 632 for TV shows in which Famous Actress appeared. The knowledge panel 520 also includes a social networking element 634 that provides information about a social network page that is related to Famous Actress.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying a set of resources, each resource including at least one image and referencing at least one entity;
   for each image included in at least one of the resources:
      determining, for each of one or more entities, an overall entity score for the image and the entity based on (i) an entity-image score that specifies a measure of topical relatedness between the image and the entity and (ii) an entity-resource score that specifies a measure of topical relatedness between the entity and a resource that includes the image; and
      assigning the image to a particular entity from among the one or more entities based on the overall entity score for the image and the particular entity;
   for each individual entity referenced by at least one of the resources:
      identifying a group of images that have been assigned to the individual entity;
      determining an image rank score for each particular image in the group, the image rank score for each particular image being determined based at least on visual characteristics of the particular image; and
      selecting, as a single image evocative of the individual entity, an image from the group based on the image rank scores.

2. The method of claim 1, wherein determining an image rank score for each particular image in the group comprises determining the image rank score for the particular image based on both the visual characteristics of the particular image and the entity-image score for the particular image and the individual entity.

3. The method of claim 1, wherein determining an image rank score for each particular image in the group comprises:
   identifying a number of resources that include the particular image in the group; and
   determining the image rank score for the particular image based on the number of resources that include the particular image.

4. The method of claim 1, wherein determining an image rank score for each particular image in the group comprises:
   determining that the individual entity is a person;
   for each particular image in the group:
      determining whether the particular image includes a depiction of a face; and
      determining the image rank score for the particular image based on whether the particular image includes a depiction of a face.

5. The method of claim 1, further comprising validating the selected image by:
   performing a search using the selected image to identify resources relevant to the selected image;
   determining, based on results identified by the search, that the selected image is not included on a resource that is included in a list of unqualified resources; and
   in response to determining that the selected image is not included on a resource included in the list of unqualified resources, validating the selected image as eligible to be provided in response to requests for an image of the entity.

6. The method of claim 1, wherein determining an image rank score for each particular image in the group comprises:

identifying one or more entity queries for the individual entity;

causing a limited image search to be performed for each of the one or more entity queries, each limited image search being limited to the group of images for the individual entity, each limited search identifying a ranking for the images in the group;

identifying a proper subset of the images in the group based on the rankings; and determining the image rank score for each image of the proper subset of images.

7. A system, comprising:

a data processing apparatus; and a memory storage apparatus in data communication with the data processing apparatus, the memory storage apparatus storing instructions executable by the data processing apparatus and that upon such execution cause the data processing apparatus to perform operations comprising:

identifying a set of resources, each resource including at least one image and referencing at least one entity;

for each image included in at least one of the resources:

determining, for each of one or more entities, an overall entity score for the image and the entity based on (i) an entity-image score that specifies a measure of topical relatedness between the image and the entity and (ii) an entity-resource score that specifies a measure of topical relatedness between the entity and a resource that includes the image; and assigning the image to a particular entity from among the one or more entities based on the overall entity score for the image relative to and the particular entity;

for each individual entity referenced by at least one of the resources:

identifying a group of images that have been assigned to the individual entity;

determining an image rank score for each particular image in the group, the image rank score for each particular image being determined based at least on visual characteristics of the particular image; and selecting, as a single image evocative of the individual entity, an image from the group based on the image rank scores.

8. The system of claim 7, wherein determining an image rank score for each particular image in the group comprises determining the image rank score for the particular image based on both the visual characteristics of the particular image and the entity-image score for the particular image and the individual entity.

9. The system of claim 7, wherein determining an image rank score for each particular image in the group comprises:

identifying a number of resources that include the particular image in the group; and determining the image rank score for the particular image based on the number of resources that include the particular image.

10. The system of claim 7, wherein determining an image rank score for each particular image in the group comprises:

determining that the individual entity is a person;

for each particular image in the group:

determining whether the particular image includes a depiction of a face; and determining the image rank score for the particular image based on whether the particular image includes a depiction of a face.

11. The system of claim 7, wherein the instructions upon execution cause the data processing apparatus to perform further operations comprising validating the selected image by:

performing a search using the selected image to identify resources relevant to the selected image;

determining, based on results identified by the search, that the selected image is not included on a resource that is included in a list of unqualified resources; and in response to determining that the selected image is not included on a resource included in the list of unqualified resources, validating the selected image as eligible to be provided in response to requests for an image of the entity.

12. The system of claim 7, wherein determining an image rank score for each particular image in the group comprises:

identifying one or more entity queries for the individual entity;

causing a limited image search to be performed for each of the one or more entity queries, each limited image search being limited to the group of images for the individual entity, each limited search identifying a ranking for the images in the group;

identifying a proper subset of the images in the group based on the rankings; and determining the image rank score for each image of the proper subset of images.

13. A computer storage medium encoded with a computer program, the program comprising instructions that when executed by a data processing apparatus cause the data processing apparatus to perform operations comprising:

identifying a set of resources, each resource including at least one image and referencing at least one entity;

for each image included in at least one of the resources:

determining, for each of one or more entities, an overall entity score for the image and the entity based on (i) an entity-image score that specifies a measure of topical relatedness between the image and the entity and (ii) an entity-resource score that specifies a measure of topical relatedness between the entity and a resource that includes the image; and assigning the image to a particular entity from among the one or more entities based on the overall entity score for the image and the particular entity;

for each individual entity referenced by at least one of the resources:

identifying a group of images that have been assigned to the individual entity;

determining an image rank score for each particular image in the group, the image rank score for each particular image being determined based at least on visual characteristics of the particular image; and selecting, as a single image evocative of the individual entity, an image from the group based on the image rank scores.

14. A method performed by data processing apparatus, the method comprising:

identifying, for an entity, one or more entity queries for the entity, the entity queries for the entity being search queries that have been deemed requests for information about the entity;

identifying a set of images related to the entity, each image of the set of images being relevant to at least one of the entity queries;

identifying resources that each include at least one image from the set of images;

determining, for each of the identified resources, an entity-resource score for the resource, the entity-resource score for each resource being a measure of topicality of the resource's content with respect to the entity;

selecting a proper subset of images from the set of images based on the entity-resource scores for the resources that include the images;

determining an image rank score for each image of the proper subset, the image rank score for each image of the proper subset being based at least on visual characteristics of the image; and selecting an image that is evocative of the entity based on the image rank scores for the images of the subset of images.

15. The method of claim 14, wherein selecting a proper subset of images from the set of images comprises:
for each image of the set of images:
identifying the entity-resource score for each resource with which the image is included;
determining whether at least a threshold number of resources which the image is included has an entity-resource score that satisfies a threshold score; and
assigning the image to the proper subset in response to determining that at least a threshold number of resources with which the image is included has an entity-resource score that satisfies the threshold score.

16. The method of claim 14, wherein identifying a set of images related to the entity comprises:
for each entity query of the one or more entity queries for the entity:
performing an image search operation using the entity query as an input, the image search operation identifying one or more images relevant to the entity query; and
selecting up to a threshold number of the one or more images for inclusion in the set of images.

17. The method of claim 14, wherein the image rank score for each image of the proper subset is based on a number of resources with which the image is included.

18. The method of claim 14, wherein:
the entity is a person; and
the image rank score for each image is based on whether the image includes a depiction of a face.

19. The method of claim 14, wherein:
the entity is a country or state; and
the image rank score for each image is based on whether the image includes a depiction of a flag.

20. The method of claim 14, wherein:
the entity is an organization; and
the image rank score for each image is based on whether the image includes a depiction of a logo.

21. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
identifying, for an entity, one or more entity queries for the entity, the entity queries for the entity being search queries that have been deemed requests for information about the entity;
identifying a set of images related to the entity, each image of the set of images being relevant to at least one of the entity queries;
identifying resources that each include at least one image from the set of images;
determining, for each of the identified resources, an entity-resource score for the resource, the entity-resource score for each resource being a measure of topicality of the resource's content with respect to the entity;
selecting a proper subset of images from the set of images based on the entity-resource scores for the resources that include the images;
determining an image rank score for each image of the proper subset, the image rank score for each image of the proper subset being based at least on visual characteristics of the image; and
selecting an image that is evocative of the entity based on the image rank scores for the images of the subset of images.

22. The system of claim 21, wherein selecting a proper subset of images from the set of images comprises:
for each image of the set of images:
identifying the entity-resource score for each resource with which the image is included;
determining whether at least a threshold number of resources which the image is included has an entity-resource score that satisfies a threshold score; and
assigning the image to the proper subset in response to determining that at least a threshold number of resources with which the image is included has an entity-resource score that satisfies the threshold score.

23. The system of claim 21, wherein identifying a set of images related to the entity comprises:
for each entity query of the one or more entity queries for the entity:
performing an image search operation using the entity query as an input, the image search operation identifying one or more images relevant to the entity query; and
selecting up to a threshold number of the one or more images for inclusion in the set of images.

24. The system of claim 21, wherein the image rank score for each image of the proper subset is based on a number of resources with which the image is included.

25. The system of claim 21, wherein:
the entity is a person; and
the image rank score for each image is based on whether the image includes a depiction of a face.

26. The system of claim 21, wherein:
the entity is a country or state; and
the image rank score for each image is based on whether the image includes a depiction of a flag.

27. The system of claim 21, wherein:
the entity is an organization; and
the image rank score for each image is based on whether the image includes a depiction of a logo.

28. A computer storage medium encoded with a computer program, the program comprising instructions that when executed by a data processing apparatus cause the data processing apparatus to perform operations comprising:
identifying, for an entity, one or more entity queries for the entity, the entity queries for the entity being search queries that have been deemed requests for information about the entity;
identifying a set of images related to the entity, each image of the set of images being relevant to at least one of the entity queries;
identifying resources that each include at least one image from the set of images;

determining, for each of the identified resources, an entity-resource score for the resource, the entity-resource score for each resource being a measure of topicality of the resource's content with respect to the entity;

selecting a proper subset of images from the set of images based on the entity-resource scores for the resources that include the images;

determining an image rank score for each image of the proper subset, the image rank score for each image of the proper subset being based at least on visual characteristics of the image; and selecting an image that is evocative of the entity based on the image rank scores for the images of the subset of images.

29. The computer storage medium of claim 28, wherein selecting a proper subset of images from the set of images comprises:

for each image of the set of images:
identifying the entity-resource score for each resource with which the image is included;

determining whether at least a threshold number of resources which the image is included has an entity-resource score that satisfies a threshold score; and assigning the image to the proper subset in response to determining that at least a threshold number of resources with which the image is included has an entity-resource score that satisfies the threshold score.

30. The computer storage medium of claim 28, wherein identifying a set of images related to the entity comprises:

for each entity query of the one or more entity queries for the entity:
performing an image search operation using the entity query as an input, the image search operation identifying one or more images relevant to the entity query; and selecting up to a threshold number of the one or more images for inclusion in the set of images.

31. The computer storage medium of claim 28, wherein the image rank score for each image of the proper subset is based on a number of resources with which the image is included.

* * * * *